United States Patent [19]

Nanaumi et al.

[11] 4,193,443
[45] Mar. 18, 1980

[54] HEAT EXCHANGER FOR COOLING SYSTEM COMPRESSED AIR DEHUMIDIFIERS

[75] Inventors: Kazuyuki Nanaumi; Koji Baba, both of Susaka, Japan

[73] Assignee: Orion Machinery Co., Ltd., Nagano, Japan

[21] Appl. No.: 932,323

[22] Filed: Aug. 9, 1978

[30] Foreign Application Priority Data

Nov. 28, 1977 [JP] Japan ................... 52/158289[U]
Dec. 29, 1977 [JP] Japan ................... 52/176709[U]

[51] Int. Cl.$^2$ .................................................. F28B 1/00
[52] U.S. Cl. ............................................ 165/66; 62/90;
62/93; 62/272; 62/317; 165/110; 165/113; 165/163
[58] Field of Search .................... 62/90, 93, 272, 317;
165/113, 161, 163, 155, 154, 160, 66, 110

[56] References Cited

U.S. PATENT DOCUMENTS

| | | | |
|---|---|---|---|
| 3,482,625 | 12/1969 | Bray | 165/163 |
| 3,630,276 | 12/1971 | Paine | 165/158 |
| 3,818,718 | 6/1974 | Freese | 62/272 |

FOREIGN PATENT DOCUMENTS

2656483  6/1978  Fed. Rep. of Germany ............. 62/93

*Primary Examiner*—Sheldon Richter
*Attorney, Agent, or Firm*—Toren, McGeady and Stanger

[57] ABSTRACT

A heat exchanger for cooling system compressed air dehumidifiers includes an inner body forming a dehumidifying passage provided with a cooler, an outer body surrounding the inner body and forming a precooling passage along the outer periphery of the inner body, an air supply port opened in the outer body through which compressed air is led into the precooling passage from one end thereof, a communicating hole opened in the inner body to guide the air led into the precooling passage out through its other end into the dehumidifying passage through one end thereof, and a plurality of heat transmitting pipes extending through the precooling passage in order to form an air-flow passage which guides the compressed air out of the other end of the dehumidifying passage to an air discharge port provided in the outer body. The heat of the compressed air in the air-flow passage which has been cooled and dehumidified in the dehumidifying passage and is flowing towards the air discharge port is exchanged with that of the compressed air of relatively high temperature in the precooling passage flowing from the air supply port towards the dehumidifying passage. In this manner, the heat exchanger simultaneously precools the compressed air to be dehumidified and heats already dehumidified compressed air. Further, by maintaining the outer body which forms the outer surface of the heat exchanger at a relatively high temperature dewdrops on the surface are prevented from forming.

6 Claims, 6 Drawing Figures

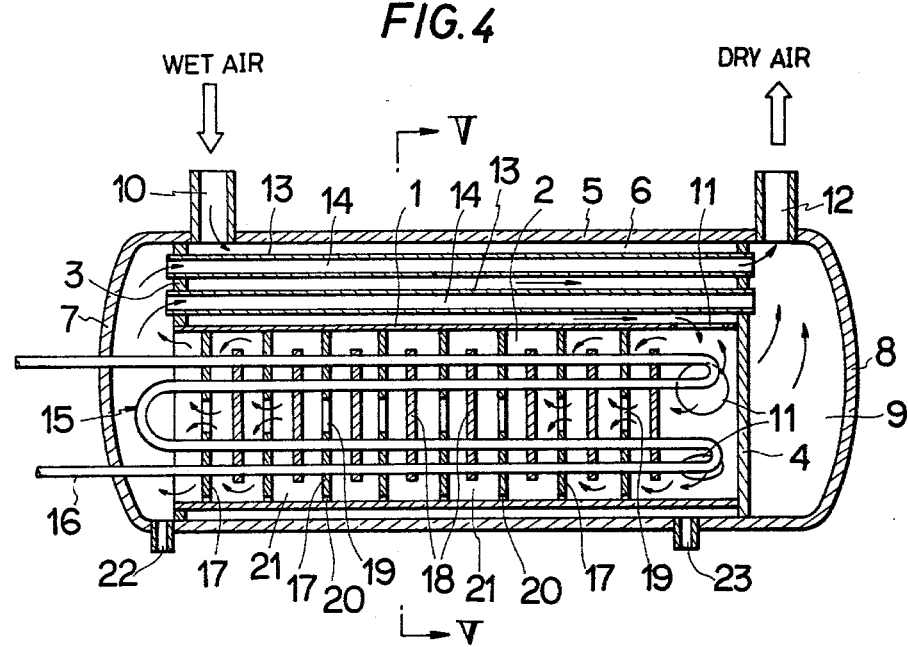
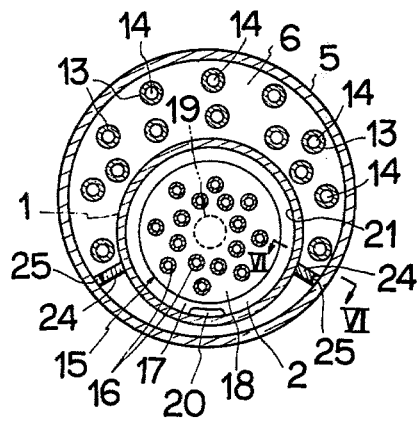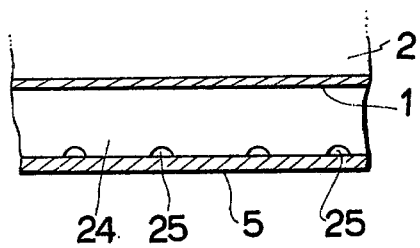

HEAT EXCHANGER FOR COOLING SYSTEM COMPRESSED AIR DEHUMIDIFIERS

BACKGROUND OF THE INVENTION

1. Field of the Invention

This invention relates to a heat exchanger for cooling system compressed air dehumidifiers which separates moisture from compressed air by bringing the air in contact with a cooler and adhering the moisture contained in the air on the outer surface of the cooler in the form of dewdrops.

2. Description of the Prior Art

Conventionally, heat exchangers for cooling system compressed air dehumidifiers comprise a heat exchanger for precooling compressed air and another heat exchanger for cooling and dehumidifying the precooled compressed air, each of which is provided with its own cooler. Although it varies according to the pressure and temperature of the compressed air and degree of dehumidifying, the conventional dehumidifiers generally cool compressed air in the range of 2° C.–15° C., and separate the moisture from the compressed air by transforming it into dewdrops in the dehumidifying passage. The casing for the heat exchangers, therefore, is also cooled at around the same temperature as that of the interior of the dehumidifying passage, causing the moisture in the open air which comes into contact with the casing to form into dewdrops on its outer surface. In order to prevent these dewdrops from forming, the casings of conventional heat exchangers are made adiabatic. This adiabatic treatment of the casing makes the heat exchangers very expensive, and it is also quite uneconomical to construct two different heat exchangers for precooling and dehumidifying, and to provide them each with their own cooler.

SUMMARY OF THE INVENTION

The object of the present invention is to provide a heat exchanger for cooling system compressed air dehumidifiers which eliminates drawbacks of conventional dehumidifiers.

Another object of the present invention is to provide a heat exchanger for cooling system compressed air dehumidifiers in which adiabatic treatment of the heat exchanger is obviated by surrounding the heat exchanger which is for dehumidifying and which cools and dehumidifies compressed air, by another heat exchanger for precooling, whereby reduction in over-all size is made possible.

Further object of the present invention is to provide a heat exchanger for cooling system compressed air dehumidifiers in which it is possible to precool compressed air without a special cooler by effecting heat exchange between compressed air cooled and dehumidified in the dehumidifying passage and air newly supplied to the passage, and in which the relative humidity of the dehumidified compressed air can be lowered by heating it.

Briefly, the present invention may be described as a heat exchanger for cooling system compressed air dehumidifiers comprising an inner body forming a dehumidifying passage provided with a cooler, an outer body surrounding the inner body and forming a precooling passage outside the inner body, an air supply port provided in the outer body through which compressed air flows into the precooling passage from one end thereof, a communicating opening provided in the inner body through which compressed air flowing into the precooling passage is led into the dehumidifying passage from one end thereof, and a plurality of heat transmitting pipes extending through the precooling passage forming air-flow passages which guide compressed air flowing into the dehumidifying passage to an air discharge port through the other end of the dehumidifying passage.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 4 is a longitudinal sectional view of the second embodiment of the heat exchanger for cooling system compressed air dehumidifiers according to the present invention;

FIG. 5 is a sectional view taken on line V—V of FIG. 4; and

FIG. 6 is a sectional view taken on line VI—VI of FIG. 4.

DETAILED DESCRIPTION OF THE INVENTION

Figure 1:
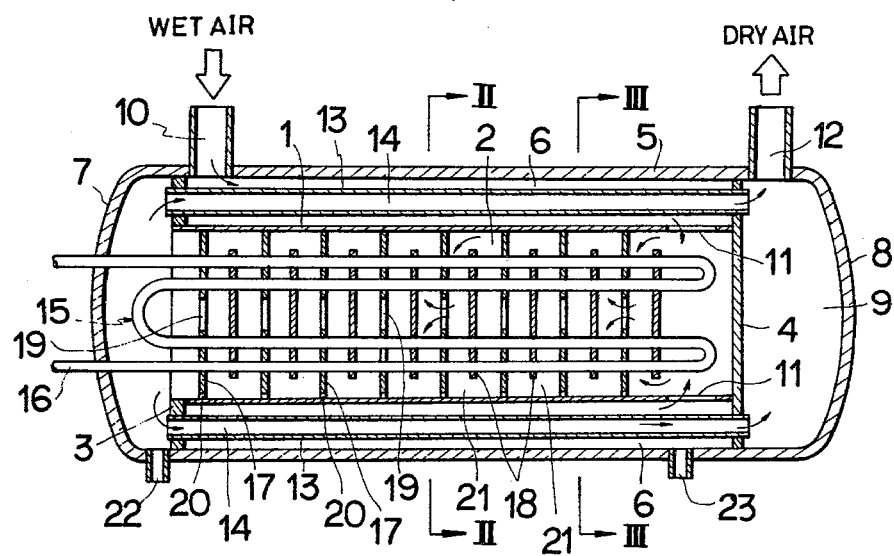
FIG. 1 is a longitudinal sectional view of the first embodiment of the heat exchanger for cooling system compressed air dehumidifiers according to the present invention.
Figure 2:
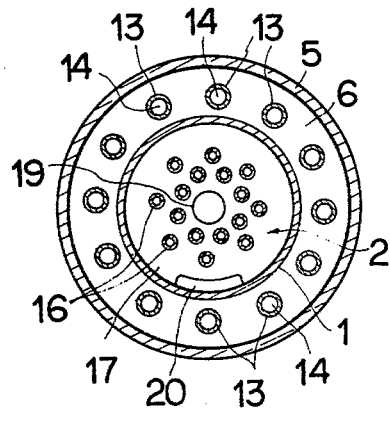
FIG. 2 is a sectional view taken on line II—II of FIG. 1.
Figure 3:
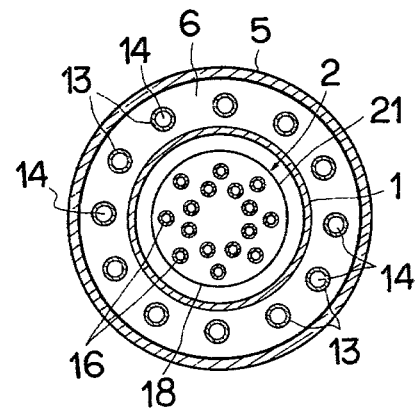
FIG. 3 is a sectional view taken on line III—III of FIG. 1.

Referring now to FIGS. 1–3 which show a first embodiment of the invention, an inner body 1 which forms a dehumidifying passage 2 has a tube supporting ring 3 secured on the peripheral surface of one end thereof. A circular tube supporting plate 4 plugs the other end of the inner body 1. The outer diameters of the ring 3 and the plate 4 are identical. An outer body 5 surrounds the inner body 1, and the outer peripheral surfaces of the ring 3 and the plate 4 are fixed on its inner peripheral surface, plugging both ends of a precooling passage 6 formed between the inner body 1 and outer body 5. End plates 7, 8 are provided which close the ends of the outer body 5.

The open end of the dehumidifying passage 2 formed by the inner body 1 is closed by the end plate 7, the ring 3 and one end of the outer body 5. Outside the tube supporting plate 4, an air chamber 9 closed by an end of the outer body 5 and the other end plate 8, is formed.

An air supply port 10 provided in the outer body 5 connects an end of the precooling passage 6 closed by the tube supporting ring 3 to a compressed air discharge port (not shown). A communicating opening 11 provided in the inner body 1 connects the rear end of the precooling passage 6 to that of the dehumidifying passage 2. Compressed air supplied from an air compressor (not shown) is introduced into one end of the precooling passage 6 through the air supply port 10 and flows to the other end of the passage, from which it further flows into a rear end of the dehumidifying passage 2. An air discharge port 12 provided in the outer body 5 connects the air chamber 9 with piping linked to air operating equipment (not shown). A heat transmitting pipe 13 secured to the tube supporting ring 3 and plate 4 extends through the precooling passage 6. The ends of the heat transmitting pipe 13 are opened outside the ring 3 and plate 4, forming an air-flow passage 14 which links the open end of the dehumidifying passage 2 enclosed by the end plate 7 with the air chamber 9. Compressed air flowing into the dehumidifying passage 2 from the precooling passage 6, in the manner described above, exits the dehumidifying passage from the open end thereof and flows into the air chamber 9 through the air-flow passage 14 to be discharged through the air discharge port 12.

A cooler 15 provided in the dehumidifying passage 2 comprises a cooling pipe 16 winding within the passage, baffle rings 17 and baffle plates 18 secured alternately to the pipe, all of which serve as fins. The cooling pipe 16 is guided out of the end plate 7 and connected to a refrigerant circulating and supplying device (not shown). The outer surfaces of the baffle rings 17 are fixed on the inner surface of the inner body 1 and air-flow openings 19 are provided at their centers. At the bottom ends of the rings 17, water passages 20 are notched to let dehumidified water pass through. The baffle plates 18 are smaller in diameter than the baffle rings, and they form air-flow clearance 21 between their outer surfaces and the inner surface of the inner body 1. Together with the baffle rings 17, they block and divide the interior of the dehumidifying passage 2 and form it like a maze.

A drain port 22 connects the bottom of the dehumidifying passage 2 with a drain pipe (not shown) and another drain port 23 connects the bottom of precooling passage 6 with a drain pipe (not shown).

In the heat exchanger described above, compressed air supplied to the air supply port 10 from an air compressor (not shown), flows into one end of precooling passage 6. The air flowing through this passage is in contact with the outer surface of the heat transmitting pipe 13, until it reaches the rear end of the dehumidifying passage 2 and flows through the communicating opening 11. Compressed air thus passed into the dehumidifying passage 2 is cooled by the cooling pipe 16 of the cooler 15. This cooling of compressed air in the dehumidifying passage 2 causes the relative humidity of the air to be more than 100%, which in turn causes water mist to form within the compressed air. Since the interior of the dehumidifying passage 2 is partitioned like a maze by the baffle rings 17 and baffle plates 18, they are impinged by the compressed air and water mist formed within the air. The water mist thus adheres to the rings and plates to be moisture-separated thereon, and falls onto the bottom of the dehumidifying passage 2 in the form of waterdrops. Accordingly, in order to raise the moisture-separation or dehumidifying rate, it is not only essential to increase the cooling capability of the cooler 15 but it is also effective to increase the rate at which water mist impinges against the baffle rings 17 and baffle plates 18. This may be accomplished by arranging them as close as possible within limits so as to further complicate the maze without preventing smooth flow of the compressed air. The condensed water moisture-separated in the manner described above then flows towards the drain port 22 through the water passages 20 provided at the bottom of the baffle rings 16, to be discharged therefrom. In order to facilitate the discharge of the condense water, it is effective to slant the bottom wall of the dehumidifying passage 22 towards the drain port 22.

Compressed air cooled and dehumidified in the dehumidifying passage 2 flows into the air-chamber 9 through the air-flow passage 14 formed by the heat transmitting pipe 13 and from there to the air discharge port 12 and to air-operating equipment (not shown).

In the process of cooling and dehumidifying compressed air in this manner, compressed air of low temperature cooled and dehumidified in the dehumidifying passage 2 flows inside the heat transmitting pipe 13 which extends through the precooling passage 6 inside which flows compressed air of relatively high temperature. In this set-up, heat of compressed air flowing in the precooling passage 6 and that of compressed air flowing in the air-flow passage 14 are exchanged through the heat transmitting pipe 13. As a consequence, compressed air flowing in the precooling passage 6 is cooled by compressed air flowing in the air-flow passage 14, and is enabled to flow into the dehumidifying passage 2 after it has been lowered to a certain temperature or after it has been properly precooled. In this manner, cooling and dehumidifying efficiency in the dehumidifying passage can be increased. Compressed air flowing in the air-flow passage 14, on the other hand, is heated by the compressed air flowing in the precooling passage 6, and its relative humidity is accordingly lessened. Therefore, when the compressed air enters the air chamber 9, it is in the so-called "dry air" condition. In order to heighten the heat exchange efficiency between compressed air flowing in the precooling passage 6 and that flowing in the air-flow passage 14, the heat transmitting pipe 13 which divides the two passages should be of material of high heat conductivity and its heat-exchanging surface should be as wide as possible. The condensed water which is moisture-separated in the precooling passage 6 is discharged from the discharge port 23.

In the first embodiment of the invention shown in FIGS. 1-3, the inner body 1 and the outer body 5 are concentric and the precooling passage 6 inside which flows compressed air of relatively high temperature, is formed outside the inner body 1 which is cooled to be maintained at a low temperature. The passage 6 thus completely surrounds the outer surface of the dehumidifying passage 2. The outer body 5 which defines the outer wall of the precooling passage 6 as well as the outer casing of the entire heat exchanger is excessively cooled so as to prevent dew from forming on its outer surface. However, the present invention is not limited in scope to the structure shown in the first embodiment. For example, where there is a possibility that the condensed water which is moisture-separated in the dehumidifying passage 2 may flow into the air-flow passage 14 defined by the heat transmitting pipe 13, the dehumidifying passage 2 and the air-flow passage 14 may be joined in an area other than the bottom part of the inner body 1, i.e., an area other than the bottom part of the precooling passage 6. Such an arrangement is depicted in FIGS. 4-6 which show a second embodiment of the invention. In this embodiment, since the heat transmitting pipe 13 is straight, it extends through a part of the precooling passage other than its bottom. However, if the pipe is curved, its middle part may be placed towards the bottom of the inner body 1.

Further, in the second embodiment in order to facilitate mounting of the heat transmitting pipe 13, the width of the precooling passage 6 in the bottom of the inner body 1 is narrowed by shifting the body eccentrically towards the bottom of the outer body 5. Also, the bottom of the precooling passage 6 devoid of the heat transmitting pipe 13 is separated from the other part by partition plates 24. Notches 25 are provided in the plates 24.

Accordingly, in this embodiment even if the condensed water which is moisture-separated in the dehumidifying passage 2 is stagnant around the drain port 22, it will not flow into the air-flow passage 14 formed in the heat transmitting pipe 13. In this manner moisture separation efficiency is increased and it is easy to mount any required number of the heat transmitting pipes 13.

Further, in the second embodiment since partition plates 24 separate the interior of the precooling passage 6 into two areas, one with the heat transmitting pipes 13 and the other without them, compressed air which is about to enter the dehumidifying passage 2 is prevented from crowding in the area where there are no heat transmitting pipes, resulting in a quite satisfactory precooling effect as in the first embodiment.

It is to be understood that shapes and relative positions of the inner body 1, the outer body 5, the heat transmitting pipe 13 and those of other components are not limited to those shown in the drawings and that various changes and modifications may be made in its actual realization without departing from the spirit and scope of the invention.

While specific embodiments of the invention have been shown and described in detail to illustrate the application of the inventive principles, it will be understood that the invention may be embodied otherwise without departing from such principles.

What is claimed is:

1. A heat exchanger for cooling system compressed air dehumidifiers comprising: an inner body; an outer body forming a casing for said heat exchanger; a precooling passage formed between said inner body and said outer body; a dehumidifying passage defined within said inner body; a cooler within said dehumidifying passage, said cooler being mounted within said inner body eccentrically relative to said outer body which forms the casing of said heat exchanger; an air supply port provided in said outer body through which compressed air flows into said precooling passage from one end thereof; a communicating opening provided in said inner body through which compressed air flowing into said precooling passage is led into said dehumidifying passage from one end thereof; an air discharge port provided in said outer body; and a plurality of heat transmitting pipes extending through the interior of said precooling passage and forming air flow passages which guide compressed air from said dehumidifying passage to said air discharge port provided in said outer body through ends thereof closer to said port; said heat transmitting pipes operating to effect heat exchange between the air flowing into said precooling passage through said air supply port and air which flows through said heat transmitting pipes from said dehumidifying passage to said discharge port.

2. A heat exchanger for cooling system compressed air dehumidifiers according to claim 1, further comprising means joining said air-flow passages defined by said heat transmitting pipes and said dehumidifying passage in an area other than the bottom of said inner body.

3. A heat exchanger for cooling system compressed air dehumidifiers according to claim 1, further comprising means mounting said inner body eccentrically towards the bottom of said outer body.

4. A heat exchanger for cooling system compressed air dehumidifiers according to claim 1, wherein said cooler comprises a cooling pipe forming a passage for refrigerant and a plurality of baffle rings and baffle plates mounted to said cooling pipe partitioning said dehumidifying passage into sections formed as a maze.

5. A heat exchanger for cooling system compressed air dehumidifiers according to claim 1, wherein drain ports are provided at the bottoms of said dehumidifying passage and said precooling passage.

6. A heat exchanger according to claim 1 including partition plates for separating a part of said precooling passage which is devoid of said heat transmitting pipes from other parts thereof, said partition plates being provided in the bottom of said precooling passage.

* * * * *